(12) United States Patent
Nealon

(10) Patent No.: US 10,238,095 B2
(45) Date of Patent: Mar. 26, 2019

(54) SINKER SLIDER SYSTEM

(71) Applicant: Richard Wayne Nealon, Eugene, OR (US)

(72) Inventor: Richard Wayne Nealon, Eugene, OR (US)

(73) Assignee: Quicksplit Fishing Products, LLC, Eugene, OR (US)

( * ) Notice: Subject to any disclaimer, the term of this patent is extended or adjusted under 35 U.S.C. 154(b) by 182 days.

(21) Appl. No.: 15/491,512

(22) Filed: Apr. 19, 2017

(65) Prior Publication Data

US 2018/0303078 A1    Oct. 25, 2018

(51) Int. Cl.
  *A01K 91/04*    (2006.01)
  *A01K 85/01*    (2006.01)
  *A01K 91/053*   (2006.01)
  *A01K 95/02*    (2006.01)
  *A01K 97/06*    (2006.01)

(52) U.S. Cl.
  CPC .............. *A01K 91/04* (2013.01); *A01K 85/01* (2013.01); *A01K 91/053* (2013.01); *A01K 95/02* (2013.01); *A01K 97/06* (2013.01)

(58) Field of Classification Search
  CPC ...... A01K 91/04; A01K 91/053; A01K 97/06; A01K 95/02
  See application file for complete search history.

(56) References Cited

U.S. PATENT DOCUMENTS

| | | |
|---|---|---|
| 4,625,449 A | 12/1986 | Swinbanks et al. |
| 4,790,432 A * | 12/1988 | Rees ................. A01K 97/06 206/315.11 |
| 5,417,008 A | 5/1995 | Smith |
| 5,878,525 A | 3/1999 | Metzler |

* cited by examiner

*Primary Examiner* — Blake A Tankersley
(74) *Attorney, Agent, or Firm* — Meng Ouyang

(57) ABSTRACT

A sinker slider system comprising a slider through which a fishing line passes and an accessory to be coupled and uncoupled to the slider by a gliding motion through a slider glide track and a T track of the accessory. The gliding motion is stopped by releasing a spring-loaded member of the T track into an indent of the slider. The system may further comprise an accessory base for storing the accessory not in use. The accessory base may have a plurality of slots or sections, each of which may have a base glide track for coupling to the T track and a base indent.

20 Claims, 4 Drawing Sheets

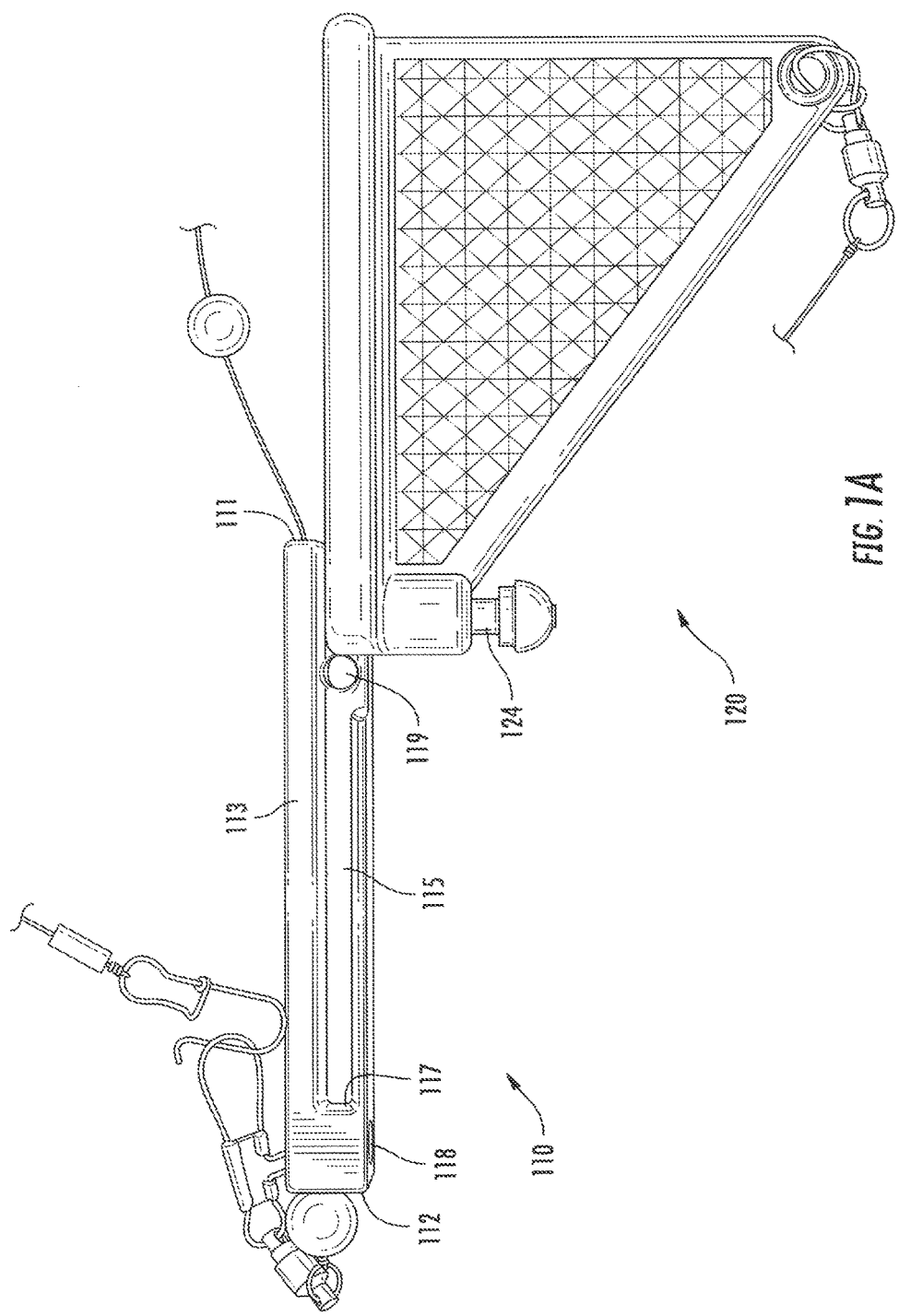

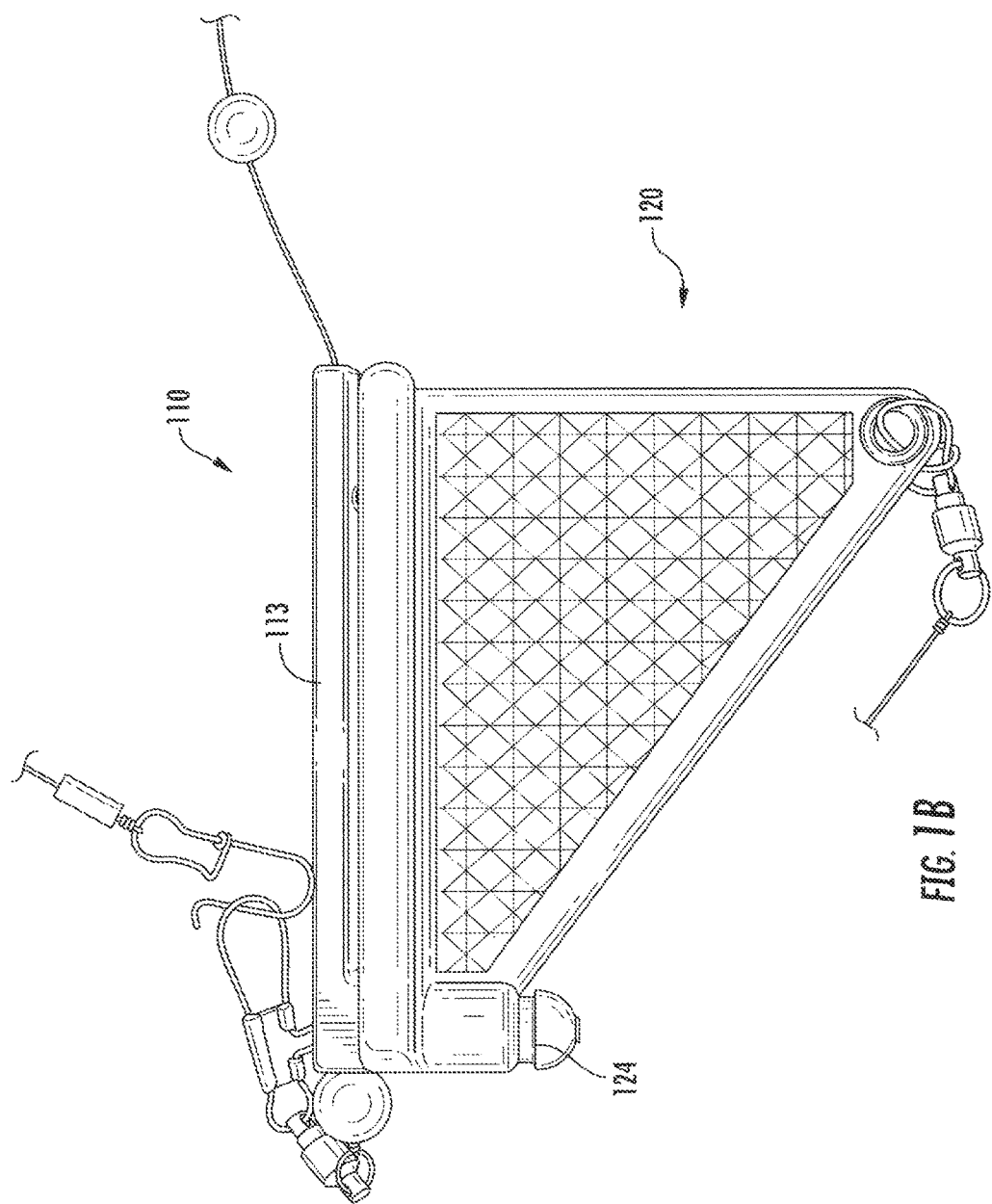

SINKER SLIDER SYSTEM

CROSS-REFERENCE TO RELATED APPLICATIONS

This is an original U.S. patent application.

FIELD OF INVENTION

The invention is in the technical field of fishing tools. More specifically, this invention relates to a fishing tool to allow fast and easy switching of fishing accessories such as spreaders and flashers without cutting the fishing line.

BACKGROUND

It is commonly known that in order to catch fish, a fisherman needs to lure the fish. There are various ways to lure fish, for example, adjusting the depth of a bait or lure by using a weight and using bait-free flashers with bright colors. Often times, fishermen switch between methods and accessories frequently in order to keep fish interested.

With existing fishing tools, each time when a fisherman switches methods or accessories, the line must be cut and re-tied. This practice not only uses time that could be spent fishing, but also is burdensome and tedious. Therefore, there is a need for a system that allows quick switching of fishing accessories without cutting the line for fishermen to spend more time fishing rather than cutting and re-tying the line.

SUMMARY

The present invention is a sinker slider system that allows switching various fishing accessories without ever having to cut the line. Embodiments of the invention are systems comprising a slider and an accessory having a T track. The slider always stays on the fishing line and has a slider glide track that allows quick coupling to and uncoupling from any accessory, such as a spreader or a diver, that has a T track through a gliding motion. The T track on the accessory has a spring-loaded member which works with an indent on the slider to stop the gliding motion. The slider may also have openings that allow weight to be hooked or snapped to the slider. The system may further comprise a base for storing accessories that are not in use and uses a base glide track for coupling with the T track of the accessory. In addition to eliminating the necessity of cutting the line, this system allows easy and fast switching of fishing accessories that even a child could operate. It is versatile and can be used in all fishing environment.

BRIEF DESCRIPTION OF THE DRAWINGS

FIG. 1A shows an embodiment of the invention where a flasher spreader is about to be coupled to a slider.

FIG. 1B shows the fully coupled flasher spreader to the slider of FIG. 1A.

DETAILED DESCRIPTION

Figure 2A:
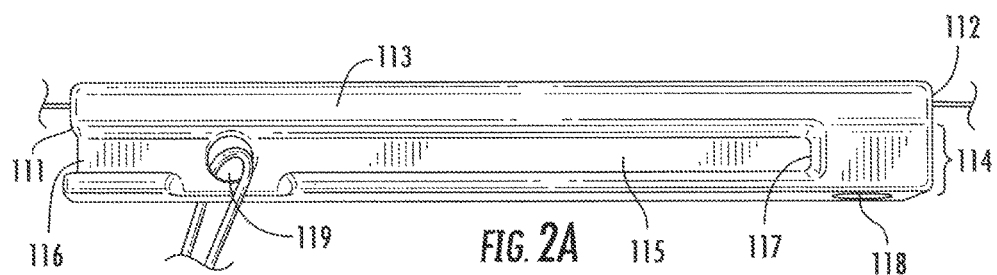
FIG. 2A is an embodiment of a slider's side view, showing a slider glide track. This embodiment also shows an opening in the slider for a hook, and the slider is indented near the opening for the hook to easily swivel.

As shown in FIGS. 1A and 1B, the sinker slider system allows quick and easy switching of an accessory. In FIG. 1A, an accessory 120 is about to be coupled to a slider 110 with a first end 111 and a second end 112. The slider comprises a spine 113 through which a fishing line is passed, a spine extension 114 (marked on FIG. 2A) with a slider glide track 115, and a slider indent 118. The slider glide track 115 has an open end 116 (marked on FIG. 2A) and a stopping end 117. As shown in FIG. 3, the accessory 120 includes a T track 121 and a spring-loaded member 124. To couple the accessory 120 to the slider 110, a user presses the open end 122 of the T track into the slider glide track 115 at the first end 111, and creates a gliding motion. The gliding motion stops when the spring-loaded member 124 is released into the slider indent 118, as shown in FIG. 1B.

The accessory 120 in the embodiment shown in FIG. 1A is a flasher spreader, but it can be other fishing accessories, such as a spreader or a diver. In one embodiment, the accessory 120 has a plurality of holes for hooks and snaps. In a preferred embodiment, the accessory 120 may have one or more bright colors to attract fish. The embodiment in FIG. 1A also shows an opening 119 on the spine extension 114 for snaps and hooks. Other embodiments of the system may have more openings 119 to accommodate additional hooks and snaps.

Figure 2B:
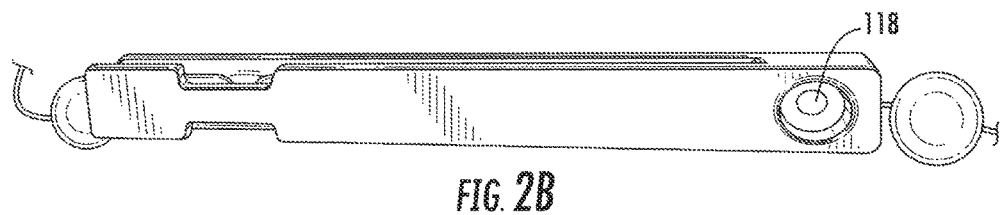
FIG. 2B illustrates the side of the slider embodiment in FIG. 2A that is opposite to the slider's spine, having a slider indent.
Figure 2C:
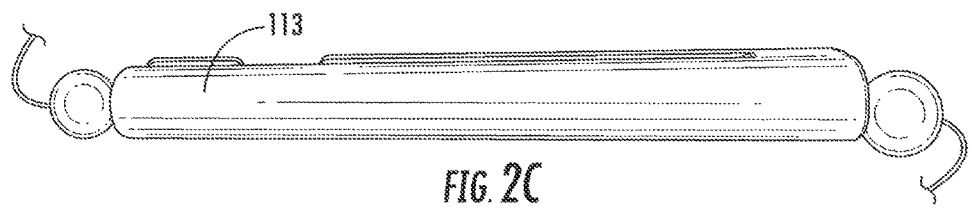
FIG. 2C illustrates the spine side of the slider embodiment in FIG. 2A.
Figure 3:
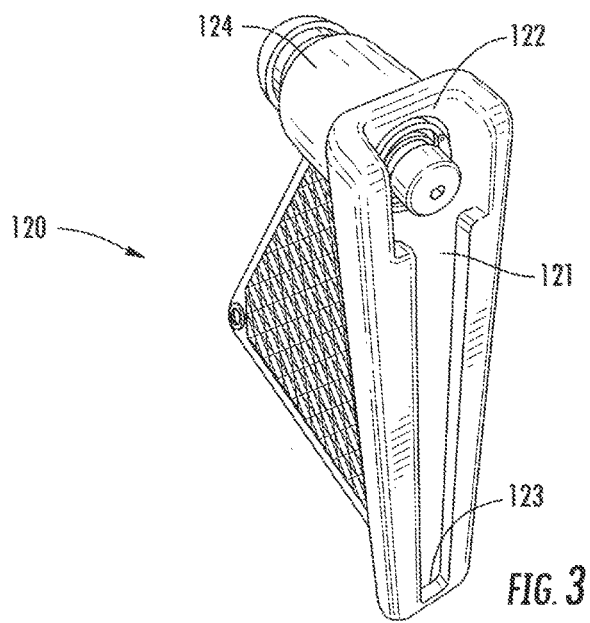
FIG. 3 is a perspective view of a flasher spreader having a T track which has a spring-loaded member at the T track's open end.

FIGS. 2A-2C are views of the slider 110 from its different sides. Two sides of the slider 110 are symmetrical, each having the slider glide track 115, and one of the two sides is shown in FIG. 2A. FIG. 2B shows the slider indent 118 on a side of the slider 110, located opposite to the spine 113 which is shown in FIG. 2C. In one embodiment, slider 110 may comprise a scent chamber for storing and releasing fishing scent. The location of the scent chamber is preferably on the spine 113 of the slider.

In one embodiment of the system, the spine extension 114 is indented near the one or more openings 119 as shown in FIGS. 2A-2B, which allows the hooks and snaps to swivel easily.

FIG. 3 shows the T track having an open end 122 and a closed end 123. When the accessory 120 is fully coupled to the slider 110, the open end 122 is aligned with the second end 112 of the slider, the closed end 123 is aligned with the first end 111 of the slider, and the spring-loaded member 124 is released into the indent 119 of the slider.

Figure 4A:
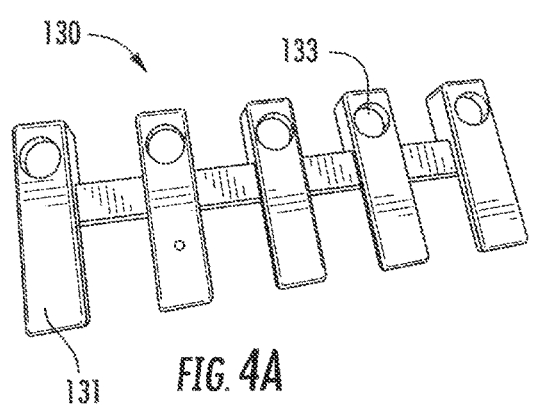
FIGS. 4A and 4B are top and side views of an embodiment of an accessory base, which has five slots, each of which has a base indent and a base glide track.
Figure 4B:
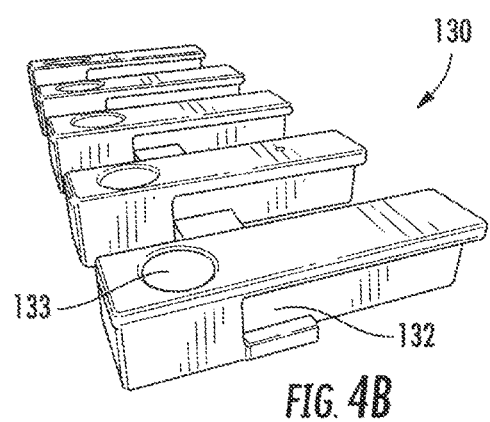

One embodiment of the system further comprises a base 130 having a plurality of slots or sections 131 for storing the accessory or accessories 120 when not in use. FIGS. 4A-4B show an embodiment of the base 130 from different perspectives. Each of the plurality of slots or sections 131 preferably comprises a base glide track 132 and a base indent 133 for coupling the accessory or accessories 120.

Figure 4C:
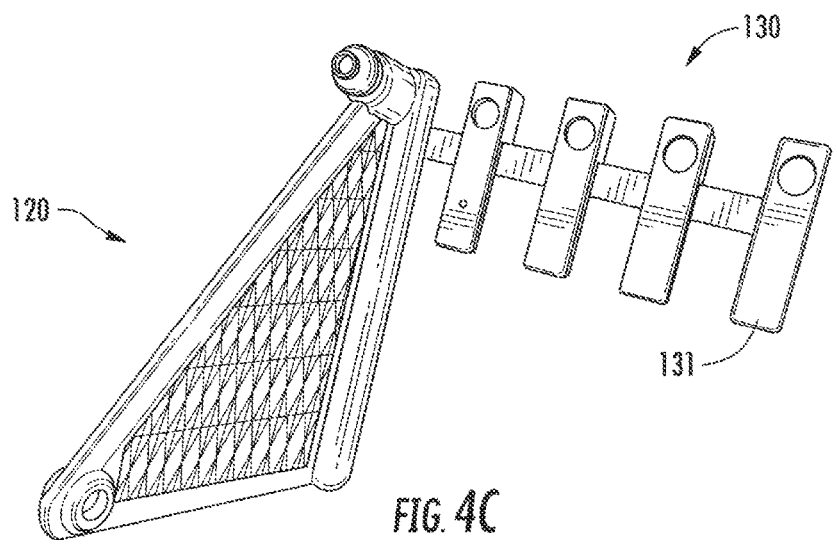
FIG. 4C shows a flasher spreader stored on the accessory base in FIGS. 4A and 4B through the base glide track.
Figure 4D:
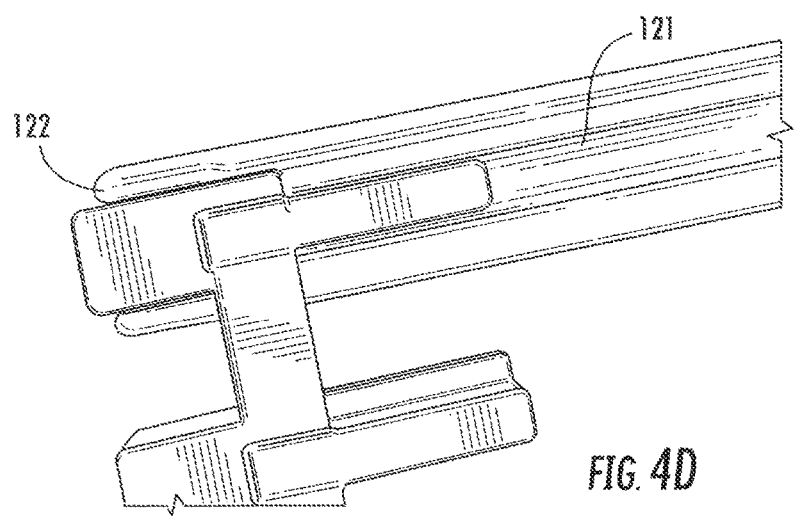
FIG. 4D shows a bottom view of FIG. 4C, demonstrating the coupling of a flasher spreader and an accessory base through the base glide track.

FIG. 4C shows one flasher spreader coupled to one slot of the base 130. FIG. 4D shows the bottom focused view of FIG. 4C at the area where the flasher spreader is coupled to the base.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or other items that can be added to the listed items.

Upon studying the disclosure, it will be apparent to those skilled in the art that various modifications and variations can be made in the invention and methods of various embodiments of the invention. Other embodiments will be apparent to those skilled in the art from consideration of the specification and practice of the embodiments disclosed herein. It is intended that the specification be considered as examples only. The various embodiments are not necessarily mutually exclusive, as some embodiments can be combined with one or more other embodiments to form new embodiments.

What is claimed is:

1. A sinker slider system comprising:
   a) a slider of an elongated shape having a first end and a second end, comprising:
      i) a spine through which a fishing line is passed;
      ii) a spine extension having a slider glide track that runs between the first end of the slider and a stopping end of the slider glide track, whereas the slider glide track is shorter than the spine extension; and
      ii) a slider indent located on a side of the spine extension opposite to the spine and between the stopping end and the second end of the slider;
   b) a spreader comprising:
      i) a T track for coupling the spreader to the slider glide track by a gliding motion, whereas the T track has an open end and a closed end; and
      ii) a spring-loaded member located at the open end of the T track, whereas the gliding motion stops when the spring-loaded member is released into the slider indent; and
   c) a spreader base having a plurality of slots for storing the spreader when not in use.

2. The system of claim 1, wherein the spreader is a flasher spreader having one or more bright colors.

3. The system of claim 1, wherein the spreader has a plurality of holes for hooks and snaps.

4. The system of claim 1, wherein the spine extension has one or more openings for hooks or snaps.

5. The system of claim 4, wherein the spine extension is indented near the one or more openings for easy movement of hooks or snaps.

6. The system of claim 1, wherein each of the plurality of slots of the spreader base comprises:
   a) a base glide track for coupling with the T track; and
   b) a base indent.

7. A sinker slider system comprising:
   a) an elongated slider comprising:
      i) a spine through which a fishing line is passed;
      ii) a spine extension comprising a slider glide track having a coupling end and a stopping end; and
      iii) a slider indent located on a side of the spine extension opposite to the spine; and
   b) a spreader comprising:
      i) a T track for coupling the spreader to the slider glide track by a gliding motion, whereas the T track has an open end and a closed end; and
      ii) a spring-loaded member at the open end of the T track for stopping the gliding motion when the spring-loaded member is released into the slider indent.

8. The system of claim 7, wherein the spreader is a flasher spreader.

9. The system of claim 7, wherein the spine extension has one or more openings for hooks or snaps.

10. The system of claim 9, wherein the spine extension is indented near the plurality of openings for easy movement of hooks or snaps.

11. The system of claim 7, wherein the system further comprises a spreader base having a plurality of slots for storing the spreader not in use.

12. The system of claim 11, wherein each of the plurality of slots comprises a base glide track for coupling with the T track and a base indent.

13. A sinker slider system comprising:
   a) an elongated slider through which a fishing line is passed, the slider having a slider glide track and a slider indent; and
   b) a spreader having a T track for coupling the spreader to the slider glide track by a gliding motion, and a spring-loaded member for stopping the gliding motion when the spring-loaded member is released into the slider indent.

14. The system of claim 13, wherein the spreader is a flasher spreader.

15. The system of claim 13, wherein the system further comprises at spreader base for storing the spreader.

16. The system of claim 15, wherein the spreader base has a plurality of slots or sections.

17. The system of claim 16, wherein each of the plurality of slots or sections comprises a base glide track for coupling with the T track and a base indent.

18. The system of claim 13, wherein the slider has one or more openings for hooks or snaps.

19. The system of claim 18, wherein the slider is indented near the one or more openings for easy movement of hooks or snaps.

20. The system of claim 13, wherein the slider comprises a scent chamber for storing and releasing fishing scent.

* * * * *